US011811112B2

(12) United States Patent
Niu et al.

(10) Patent No.: US 11,811,112 B2
(45) Date of Patent: Nov. 7, 2023

(54) FUEL CELL CONTROL SYSTEM AND FUEL CELL CONTROL METHOD

(71) Applicant: GREAT WALL MOTOR COMPANY LIMITED, Baoding (CN)

(72) Inventors: Pengfei Niu, Baoding (CN); Gaoxia Zhao, Baoding (CN); Haifeng Tang, Baoding (CN); Zeyu Zhang, Baoding (CN); Xin Jin, Baoding (CN); Peiming Wu, Baoding (CN); Xiangjun Wang, Baoding (CN); Haichao Yu, Baoding (CN); Zhengyu Wang, Baoding (CN); Yang Feng, Baoding (CN); Minglong Kang, Baoding (CN); Lei Gao, Baoding (CN); Hongshui Du, Baoding (CN); Xiaolong Ma, Baoding (CN); Ruyi Yang, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 0 days.

(21) Appl. No.: 17/790,401

(22) PCT Filed: Feb. 26, 2021

(86) PCT No.: PCT/CN2021/078158
§ 371 (c)(1),
(2) Date: Jun. 30, 2022

(87) PCT Pub. No.: WO2021/170087
PCT Pub. Date: Sep. 2, 2021

(65) Prior Publication Data
US 2023/0051988 A1 Feb. 16, 2023

(30) Foreign Application Priority Data
Feb. 28, 2020 (CN) .......................... 202010127765.7

(51) Int. Cl.
*H01M 8/04* (2016.01)
*H01M 8/04746* (2016.01)
(Continued)

(52) U.S. Cl.
CPC ... *H01M 8/04753* (2013.01); *H01M 8/04097* (2013.01); *H01M 8/04373* (2013.01);
(Continued)

(58) Field of Classification Search
CPC ......... H01M 8/04753; H01M 8/04097; H01M 8/04373; H01M 8/04388; H01M 8/04395; H01M 8/04425
See application file for complete search history.

(56) References Cited

U.S. PATENT DOCUMENTS

| 2014/0287334 A1* | 9/2014 | Noh ................. H01M 8/04753 429/432 |
| 2019/0074527 A1* | 3/2019 | Suzuki .................. F04D 25/045 |
| 2019/0131642 A1* | 5/2019 | Hayase ............. H01M 8/04761 |

FOREIGN PATENT DOCUMENTS

| CN | 209340175 U | 9/2019 |
| JP | 2016223433 A | 12/2016 |

(Continued)

OTHER PUBLICATIONS

International Search Report dated May 17, 2021, for international application No. PCT /CN2021/078158 with English translation.

*Primary Examiner* — Olatunji A Godo
(74) *Attorney, Agent, or Firm* — Nath, Goldberg & Meyer; Joshua B. Goldberg

(57) ABSTRACT

The fuel cell control system includes: a reactor; an air compressor, wherein the air compressor has a compressing cavity, the compressing cavity has a gas inlet and a gas outlet, a rotatable pressure wheel is disposed inside the compressing cavity, and the gas outlet is in communication
(Continued)

with the reactor; a control flow channel, wherein a first end of the control flow channel is in communication with the gas-intake side of the pressure wheel, a second end of the control flow channel is in communication with the wheel-back side of the pressure wheel, and the control flow channel is provided with a return valve for regulating the flow rate of the control flow channel; and a central control unit, wherein the central control unit is communicatively connected to the return valve to control the opening degree of the return valve.

19 Claims, 10 Drawing Sheets

(51) Int. Cl.
  *H01M 8/04089* (2016.01)
  *H01M 8/0432* (2016.01)
  *H01M 8/0438* (2016.01)
  H01M 8/04302 (2016.01)
  F04D 27/02 (2006.01)
(52) U.S. Cl.
  CPC ... *H01M 8/04388* (2013.01); *H01M 8/04395* (2013.01); *H01M 8/04425* (2013.01); *F04D 27/0215* (2013.01); *H01M 8/04302* (2016.02)

(56) References Cited

FOREIGN PATENT DOCUMENTS

| KR | 100748892 B1 | 8/2007 |
| KR | 20090022272 A | 3/2009 |

* cited by examiner

FUEL CELL CONTROL SYSTEM AND FUEL CELL CONTROL METHOD

CROSS REFERENCE TO RELEVANT APPLICATIONS

This is a National Phase Application filed under 35 U.S.C. 371 as a national stage of PCT/CN2021/078158, filed Feb. 26, 2021. The present disclosure claims the priority of the Chinese patent application filed on Feb. 28, 2020 before the Chinese Patent Office with the application number of 202010127765.7 and the title of "FUEL CELL CONTROL SYSTEM AND FUEL CELL CONTROL METHOD", which is incorporated herein in its entirety by reference

TECHNICAL FIELD

The present disclosure relates to the technical field of fuel cells, and particularly relates to a fuel cell control system and a fuel cell control method.

BACKGROUND

In order to guarantee the normal operation of fuel cell engines, it is required to install auxiliary systems such as a hydrogen supplying system, a clean-fresh-air supplying system and a circulating-water-cooling managing system. Moreover, air supply of a high quality and a high flow rate has an obvious effect for the increasing of the power output of fuel cell engines, thus an air compressor is usually required to perform forced gas intake. Because proton exchange membranes have a very high requirement on the degree of the cleanliness of the air, air compressors are not allowed to use conventional oil-lubricated bearings (for example, a dynamic-pressure sliding bearing), but usually a dynamic pressure air bearing is used to support the rotor and offset the axial load of the rotor system.

SUMMARY

In view of the above, the present disclosure aims to provide a fuel cell control system. The fuel cell control system can reduce the axial force, prolong the service life, improve the efficiency of the system and improve the performance, and can realize precise controlling to the system, to satisfy the operation demands of the air compressor in different working conditions.

In order to achieve the above object, the technical solutions of the present disclosure are realized as follows:

A fuel cell control system according to an embodiment of the present disclosure includes:
  a reactor;
  an air compressor, wherein the air compressor has a compressing cavity, the compressing cavity has a gas inlet and a gas outlet, a rotatable pressure wheel is disposed inside the compressing cavity, and the gas outlet is in communication with the reactor;
  a control flow channel, wherein a first end of the control flow channel is in communication with a gas-intake side of the pressure wheel, a second end of the control flow channel is in communication with a wheel-back side of the pressure wheel, and the control flow channel is provided with a return valve for regulating a flow rate of the control flow channel; and
  a central control unit, wherein the central control unit is communicatively connected to the return valve to control an opening degree of the return valve.

In the fuel cell control system according to the embodiments of the present disclosure, by using the control flow channel, part of the compressed high-pressure gas flows back via the control flow channel to the gas inlet, and part of the pressure energy of the gas is converted into kinetic energy, which reduces the pressure on the wheel-back side of the pressure wheel, and reduces the axial force, thereby prolonging the service life of the air compressor, and improving the efficiency of the system. Furthermore, the flow rate of the gas flowing through the control flow channel is controlled by controlling the opening degree of the return valve, which can realize precise controlling on the system, satisfy the operation demands of the air compressor in different working conditions, and optimize the work performance of the air compressor in special working conditions. In addition, the gas flowing back to the gas inlet re-enters the pressure wheel to be compressed, which can effectively improve the field surging characteristic of the air compressor, and improve the performance of the air compressor.

Optionally, the system further includes: an air filter; and
  the air filter is disposed in a gas-intake direction of the air compressor, and is located at an upstream of the gas inlet.

According to some embodiments of the present disclosure, the fuel cell control system further includes:
  a first sensor for detecting an intake pressure and/or an intake temperature of the air compressor, wherein the first sensor is adjacent to the gas inlet, and is communicatively connected to the central control unit.

Optionally, the first sensor is disposed in a gas-intake direction of the air compressor, and is located at a downstream of the first end of the control flow channel.

According to some embodiments of the present disclosure, the fuel cell control system further includes:
  a second sensor for detecting a rotational speed of the pressure wheel, wherein the second sensor is adjacent to the pressure wheel, and is communicatively connected to the central control unit.

According to some embodiments of the present disclosure, an intercooler is disposed between the gas outlet and the reactor, a third sensor for detecting an intake temperature and/or an intake pressure of the reactor is disposed between the intercooler and the reactor, and the third sensor is communicatively connected to the central control unit.

According to some embodiments of the present disclosure, the air compressor includes:
  a housing assembly, wherein the housing assembly has the compressing cavity, an installation cavity and a rotation-shaft cooperating cavity, and the rotation-shaft cooperating cavity is disposed between the compressing cavity and the installation cavity;
  a rotor shaft, wherein the rotor shaft is rotatably fitted inside the rotation-shaft cooperating cavity, and extends into the compressing cavity and the installation cavity, and the pressure wheel is nested to the rotor shaft; and
  a driving assembly, wherein the driving assembly is nested to the rotor shaft and is located inside the installation cavity.

In some embodiments of the present disclosure, the control flow channel includes an internal flow channel and an external flow channel, the internal flow channel is located inside the housing assembly, and the internal flow channel is in communication with the wheel-back side of the pressure wheel; and
  the external flow channel is located outside the housing assembly, the external flow channel is in communication with the internal flow channel and the gas-intake side of the pressure wheel, and the return valve is disposed in the external flow channel.

Optionally, the compressing cavity has an extending-throughout returning opening; and the returning opening is located on the gas-intake side of the pressure wheel, and the wheel-back side of the pressure wheel is in communication with the returning opening via the internal flow channel and the external flow channel.

Optionally, the internal flow channel is in an axial direction of the rotor shaft, and is located between the compressing cavity and the installation cavity.

In some embodiments of the present disclosure, the housing assembly includes:

- a pressing housing, wherein the pressing housing defines the compressing cavity;
- a driving housing, wherein the driving housing defines the installation cavity; and
- a back plate, wherein the back plate is disposed between the pressing housing and the driving housing, the back plate is located on the wheel-back side of the pressure wheel and forms a back-pressure gap with the pressure wheel, the driving housing is disposed on one side of the back plate that is opposite to the pressure wheel, and the back plate and the driving housing enclose to form a thrust cavity; and
- the back plate is provided with a first rotation-shaft hole, a second rotation-shaft hole is disposed inside the driving housing, a thrust bearing is disposed inside the thrust cavity, and the first rotation-shaft hole, the second rotation-shaft hole and the thrust cavity jointly define the rotation-shaft cooperating cavity.

In some particular embodiments of the present disclosure, a gas guiding channel is disposed at the back plate or the driving housing, and the gas guiding channel is in communication with the back-pressure gap to form a part of the control flow channel.

Optionally, a gas guiding channel is formed between the back plate and the driving housing, a gas guiding hole is disposed at the back plate or the driving housing, and the back-pressure gap, the gas guiding channel and the gas guiding hole are communicated to form a part of the control flow channel.

Optionally, a shaft seal is nested to the rotor shaft, the rotor shaft is mounted inside the first rotation-shaft hole by using the shaft seal, a flowing gap is formed between the shaft seal and an inner wall of the first rotation-shaft hole, and the back-pressure gap is in communication with the gas guiding channel or the gas guiding hole via the flowing gap.

Optionally, the thrust bearing includes: a thrust rotor, a bearing foil and a holding ring;

- the thrust rotor is nested to the rotor shaft, the bearing foil is disposed on a side wall of the thrust cavity, and the bearing foil and the thrust rotor are spaced to form a thrust gap that is in communication with the first rotation-shaft hole; and
- the holding ring is disposed inside the thrust cavity, the holding ring surrounds the thrust rotor, and the holding ring is sandwiched between the driving housing and the back plate.

Another object of the present disclosure is to provide a fuel cell control method, to reduce the axial force, prolong the service life, improve the efficiency of the system and improve the performance, and the method can realize precise controlling to the system, to satisfy the operation demands of the air compressor in different working conditions.

In order to achieve the above object, the technical solutions of the present disclosure are realized as follows:

A fuel cell control method, the fuel cell control method being for the fuel cell control system according to the embodiments in the first aspect of the present disclosure, wherein the method includes:

electrifying to start up the air compressor; and according to a rotational speed of the air compressor and a pressure of a gas entering the reactor, controlling an opening amplitude of the return valve.

The fuel cell control method according to the embodiments of the present disclosure can reduce the axial force, thereby prolonging the service life of the air compressor, and improving the efficiency of the system. Furthermore, according to the rotational speed of the air compressor and the pressure of the gas entering the reactor, the opening degree of the return valve is controlled, to control the flow rate of the gas flowing through the control flow channel, which can realize precise controlling on the system, satisfy the operation demands of the air compressor in different working conditions, and optimize the work performance of the air compressor in special working conditions. In addition, the gas flowing back to the gas inlet re-enters the pressure wheel to be compressed, which can effectively improve the field surging characteristic of the air compressor, and improve the performance of the air compressor.

According to some embodiments of the present disclosure, the method includes when the rotational speed of the air compressor is less than a first rotational speed, controlling the return valve to open by a first amplitude;

when the rotational speed of the air compressor is greater than or equal to the first rotational speed and less than a second rotational speed, controlling the opening amplitude of the return valve to be zero; and when the rotational speed of the air compressor is greater than or equal to the second rotational speed and the pressure of the gas entering the reactor reaches a preset value, controlling the return valve to open by a second amplitude, wherein the second amplitude is greater than the first amplitude.

The present disclosure further provides a computing and processing device, wherein the computing and processing device includes:

a memory storing a computer-readable code; and one or more processors, wherein when the computer-readable code is executed by the one or more processors, the computing and processing device executes the fuel cell control method stated above.

The present disclosure further provides a computer program, wherein the computer program includes a computer-readable code, and when the computer-readable code is executed in a computing and processing device, the computer-readable code causes the computing and processing device to execute the fuel cell control method stated above.

The present disclosure further provides a computer-readable medium, wherein the computer-readable medium stores the computer program stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

The drawings, which form part of the present disclosure, are intended to provide a further understanding of the present disclosure. The illustrative embodiments of the present disclosure and their explanation are intended to interpret the present disclosure, and do not inappropriately limit the present disclosure. Apparently, the figures that are described below are embodiments of the present disclosure, and a person skilled in the art can obtain other figures according to these figures without paying creative work. In the drawings.

Figure 1:
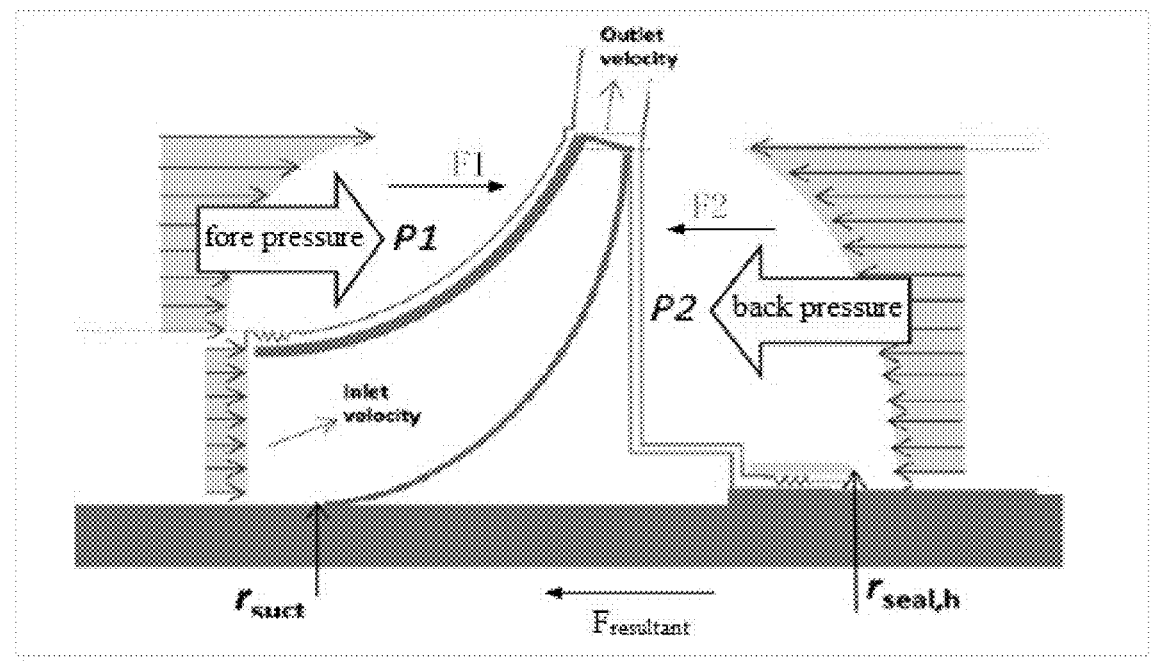
FIG. 1 is a schematic diagram of the principle of the generation of the axial force of an air compressor in the related art.

Description of the reference numbers:

fuel cell control system 1;

air compressor 10, bolt 11, external flow channel 12, rubber sealing ring 13, nut 14, return valve 15, first sensor 16, second sensor 17 and third sensor 18;

housing assembly 100, compressing cavity 101, installation cavity 102, flow guiding gap 103, thrust cavity 104, back-pressure gap 105 and ventilating gap 106;

pressing housing 110, returning opening 111, gas releasing hole 112, gas inlet 113, gas outlet 114, driving housing 120, second rotation-shaft hole 121, back plate 130, first rotation-shaft hole 131, gas guiding hole 132, cover plate 140 and cooling flow channel 151;

rotor shaft 200, shaft seal 210, maze sealing member 211, pressure wheel 300, thrust bearing 400, thrust rotor 410, bearing foil 420, holding ring 430, ventilating hole 431, radial air bearing 500, sleeve 510, bearing seat 520, driving assembly 600, electric-motor stator 610 and electric-motor rotor 620; and reactor 20, after-pressure pipeline 21, central control unit 30, air filter 40 and intercooler 50.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be noted that, subject to the avoiding of any conflict, the embodiments and the features of the embodiments of the present disclosure may be combined.

The fuel cell control system 1 according to the embodiments of the present disclosure will be described in detail below with reference to the drawings.

As shown in FIGS. 2-13, a fuel cell control system 1 according to an embodiment of the present disclosure includes: a reactor 20, an air compressor 10, a control flow channel and a central control unit 30.

Particularly, the air compressor 10 has a compressing cavity 101, the compressing cavity 101 has a gas inlet 113 and a gas outlet 114, a rotatable pressure wheel 300 is disposed inside the compressing cavity 101, and the gas outlet 114 is in communication with the reactor 20. For example, the gas outlet 114 is in communication with the reactor 20 via an after-pressure pipeline 21. A first end of the control flow channel is in communication with the gas-intake side of the pressure wheel 300, and a second end of the control flow channel is in communication with the wheel-back side of the pressure wheel 300. The control flow channel is provided with a return valve 15 for regulating the flow rate of the control flow channel, and the central control unit 30 is communicatively connected to the return valve 15 to control the opening degree (i.e., the opening amplitude) of the return valve 15.

The air of a normal temperature and a normal pressure enters the pressure wheel 300 via the gas inlet 113, and the rotating pressure wheel 300, because of its special flowing structure, applies work to the air, whereby the air of the normal pressure, when flowing out of the pressure wheel 300, becomes a compressed air of a very high pressure. When the central control unit 30 controls the return valve 15 to close, the flow rate of the gas flowing through the control flow channel is zero, and the gas flowing out of the pressure wheel 300 flows to the reactor 20 via the gas outlet 114. When the central control unit 30 controls the return valve 15 to open, the gas flowing out of the pressure wheel 300 is split into two parts, wherein one part of the gas flows to the reactor 20 via the gas outlet 114, and the other part of the gas flows into the control flow channel, and flows back via the control flow channel into the compressing cavity 101. The flow rate of the gas flowing into the control flow channel may be controlled by controlling the opening degree of the return valve 15.

In the related art, as shown in FIG. 1, the air compressor compresses the air in the operation, to enable the gas to reach a certain pressure to satisfy the demand by the chemical reaction of the fuel cell reactor. At this point, the pressure (i.e., the fore pressure) of the gas on the gas-intake side of the pressure wheel is P1, the gas pressure is increased by the rotation of the pressure wheel, and the pressure (i.e., the back pressure) of the gas at the outlet and the wheel-back side of the pressure wheel is P2, wherein P2>P1. The pressure of the gas acts on the pressure wheel to generate the forces F1 and F2, and F1 and F2 have opposite directions. Because the pressure P2 on the wheel-back side is higher, finally the direction of the resultant force $F_{resultant}$ is the same as the direction of the force F2 generated by P2. That is the reason why the axial force is generated.

By research, the inventor of the present disclosure has found out that a too large axial force increases the possibility of bearing wear and reduces the reliability of the thrust bearing, thereby reducing the life of the air compressor of the fuel cell, and a too large axial force results in compelled increasing of the loading area of the thrust bearing in the designing, to offset the axial force, which results in the increasing of the frictional area of the thrust bearing, and the increasing of the power loss and the heat productivity, thereby reducing the efficiency of the entire system.

In view of the above, in the fuel cell control system 1 according to the embodiments of the present disclosure, part of the compressed high-pressure gas flows back via the control flow channel to the gas inlet 113, and a part of the pressure energy of the gas is converted into kinetic energy, which reduces the pressure on the wheel-back side of the pressure wheel 300, and reduces the axial force, thereby prolonging the service life of the air compressor 10, and improving the efficiency of the entire system. Furthermore, by controlling the opening degree of the return valve 15, the flow rate of the gas flowing through the control flow channel can be precisely controlled, which can realize precise controlling on the system, satisfy the operation demands of the air compressor 10 in different working conditions, and optimize the work performance of the air compressor 10 in special working conditions. In addition, the gas flowing back to the gas inlet 113 re-enters the pressure wheel 300 to be compressed, which can effectively improve the field surging characteristic of the air compressor 10, and improve the performance of the air compressor 10.

In some embodiments of the present disclosure, as shown in FIG. 1, the fuel cell control system 1 further includes an air filter 40. The air filter 40 is used to remove the particulate impurity in the air, and the air filter 40 is located at the upstream of the gas inlet 113 in the gas-intake direction of the air compressor 10. That can purify the air entering the air compressor 10.

In the related art, in areas of a high altitude and rarefied air, the air pressure is small, and the air density is low, which results in that the gas flowing into the gas inlet of the machine has lowered density and pressure. Furthermore, after the gas has passed through an air filter, the pressure is further reduced, whereby the gas flowing into the air compressor has reduced flow rate and flow speed, which results in the reduction of the intake efficiency of the air compressor, and even results in the flowing-back of the gas flowing into the pressure wheel. That in turn causes problems such as surge of the air compressor and overspeed of the system, which seriously affects the chemical reaction of the fuel cell, generates surge noise, and reduces the reliability of the system.

In view of the above, according to some embodiments of the present disclosure, as shown in FIG. 1, the fuel cell control system 1 further includes a first sensor 16. The first sensor 16 is for detecting the intake pressure and/or the intake temperature of the air compressor 10. The first sensor 16 is adjacent to the gas inlet 113, and the first sensor 16 is communicatively connected to the central control unit 30. For example, the first sensor 16 is located between the gas inlet 113 and the pressure wheel 300. Accordingly, the first sensor 16 can feed back the detected information (i.e., the intake pressure and the intake temperature) to the central control unit 30, and the central control unit 30 controls the opening degree of the return valve 15, to cause the flow rate of the gas flowing into the control flow channel to change. Certainly, the first sensor 16 may also be used to detect at least one of the intake pressure and the intake temperature of the air compressor 10, which may be regulated correspondingly by a person skilled in the art according to particular situations.

Figure 10:
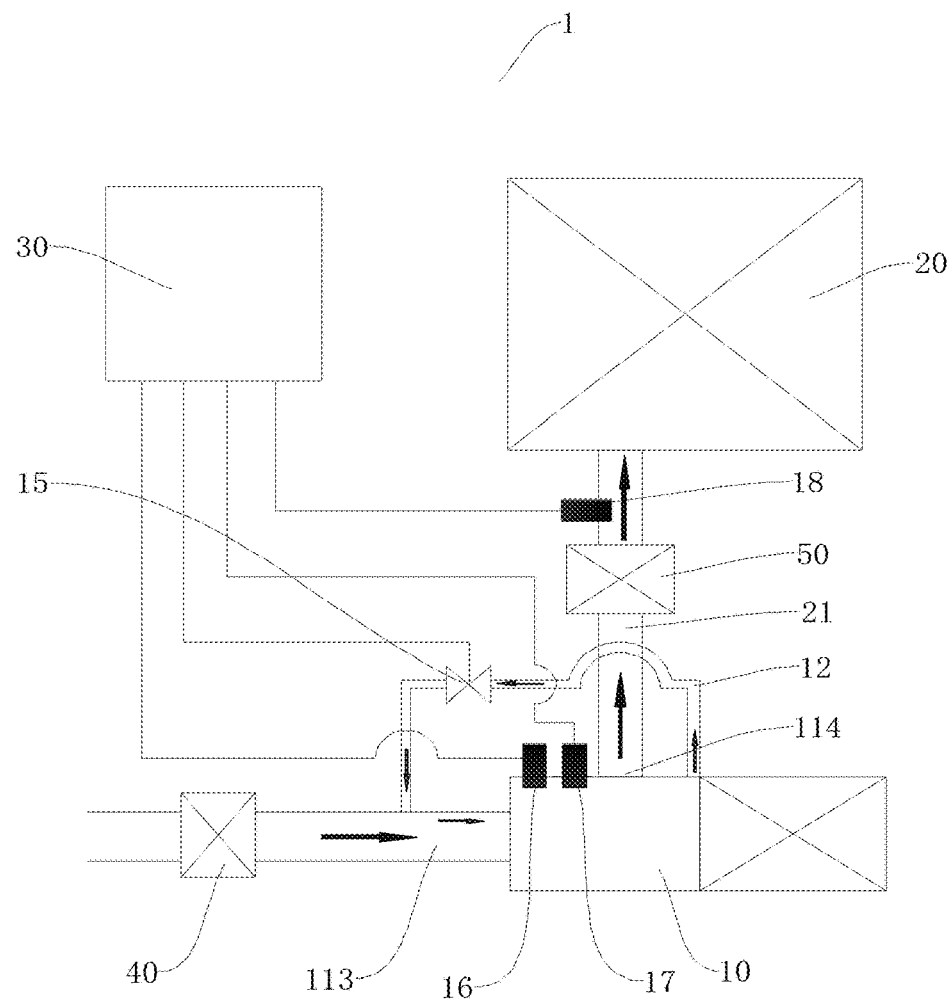
FIG. 10 is a schematic structural diagram of the fuel cell control system according to an embodiment of the present disclosure.

Particularly, as shown in FIG. 10, when the first sensor 16 has detected that the intake temperature and the intake pressure of the air compressor 10 are in an altitude environment, and it is obtained by calculation by the system that the intake temperature and the intake pressure of the air compressor 10 detected by the first sensor 16 are less than a surging air flow rate of the air compressor 10, the central control unit 30 suitably adjusts the opening degree of the return valve 15, whereby the gas of a certain flow rate flows back via the control flow channel to the gas inlet 113. The gas flowing back to the gas inlet 113 re-enters the pressure wheel 300 to be compressed, so as to increase the flow rate of the gas entering the air compressor 10, which can improve the operation state of the entire system, and optimize the work performance of the air compressor 10 in special working conditions.

According to some embodiments of the present disclosure, as shown in FIG. 1, the first sensor 16 is located at the downstream of the first end of the control flow channel in the gas-intake direction of the air compressor 10. For example, after flowing back to the gas inlet 113, the gas flowing into the control flow channel is mixed with the external air flowing into the gas inlet 113, and together passes through the first sensor 16. In other words, the gas flow detected by the first sensor 16 is the total gas flow obtained after the flowing-back gas and the external air converge. Accordingly, the first sensor 16 can detect in real time the state of the total gas flow entering the air compressor 10, and feed back to the central control unit 30, and the central control unit 30 controls the opening degree of the return valve 15 according to the actual situation, to further control the flow rate of the gas flowing back to the gas inlet 113, thereby increasing the precision of the controlling of the system.

According to some embodiments of the present disclosure, as shown in FIG. 1, the fuel cell control system 1 further includes a second sensor 17. The second sensor 17 is for detecting the rotational speed of the pressure wheel 300, the second sensor 17 is adjacent to the pressure wheel 300, and the second sensor 17 is communicatively connected to the central control unit 30.

The magnitude of the rotational speed of the pressure wheel 300 influences the magnitude of the pressure of the wheel-back side of the pressure wheel 300, thereby influencing the magnitude of the axial force. For example, when the rotational speed of the pressure wheel 300 is low, the pressure on the wheel-back side of the pressure wheel 300 is small; in other words, the axial force generated by the gas pressure is small. Therefore, a large scale of the flowing of the gas on the wheel-back side of the pressure wheel 300 is not required to reduce the axial force. When the rotational speed of the pressure wheel 300 is high, the pressure on the wheel-back side of the pressure wheel 300 is large; in other words, the axial force generated by the gas pressure is large. Therefore, a large scale of the flowing of the gas on the wheel-back side of the pressure wheel 300 is required to reduce the axial force.

Particularly, when the second sensor 17 has detected that the pressure wheel 300 has a low rotational speed, the central control unit 30 controls the return valve 15 to close, or open by a low amplitude, to ensure the flow rate of the gas flowing into the reactor 20, to ensure the performance and the responsivity of the system. When the second sensor 17 has detected that the pressure wheel 300 has a high rotational speed, the second sensor 17 communicates with the central control unit 30, and the central control unit 30 controls the return valve 15 to open by a high amplitude, to increase the efficiency of the gas flowing-back, to effectively reduce the pressure on the wheel-back side of the pressure wheel 300, and reduce the axial force. That can further increase the precision of the controlling of the system.

According to some embodiments of the present disclosure, as shown in FIG. 1, an intercooler 50 is disposed between the gas outlet 114 and the reactor 20, and a third sensor 18 is disposed between the intercooler 50 and the reactor 20. The third sensor 18 is for detecting the intake pressure and/or the intake temperature of the reactor 20, and the third sensor 18 is communicatively connected to the central control unit 30.

For example, when the third sensor 18 has detected that the pressure of the gas flowing into the reactor 20 reaches a preset value, the central control unit 30 controls the return valve 15 to open by a high amplitude, whereby the flow rate of the gas flowing into the control flow channel increases, thereby effectively reducing the pressure on the wheel-back side of the pressure wheel 300, and reducing the axial force. That can further increase the precision of the controlling of the system.

Figure 3:
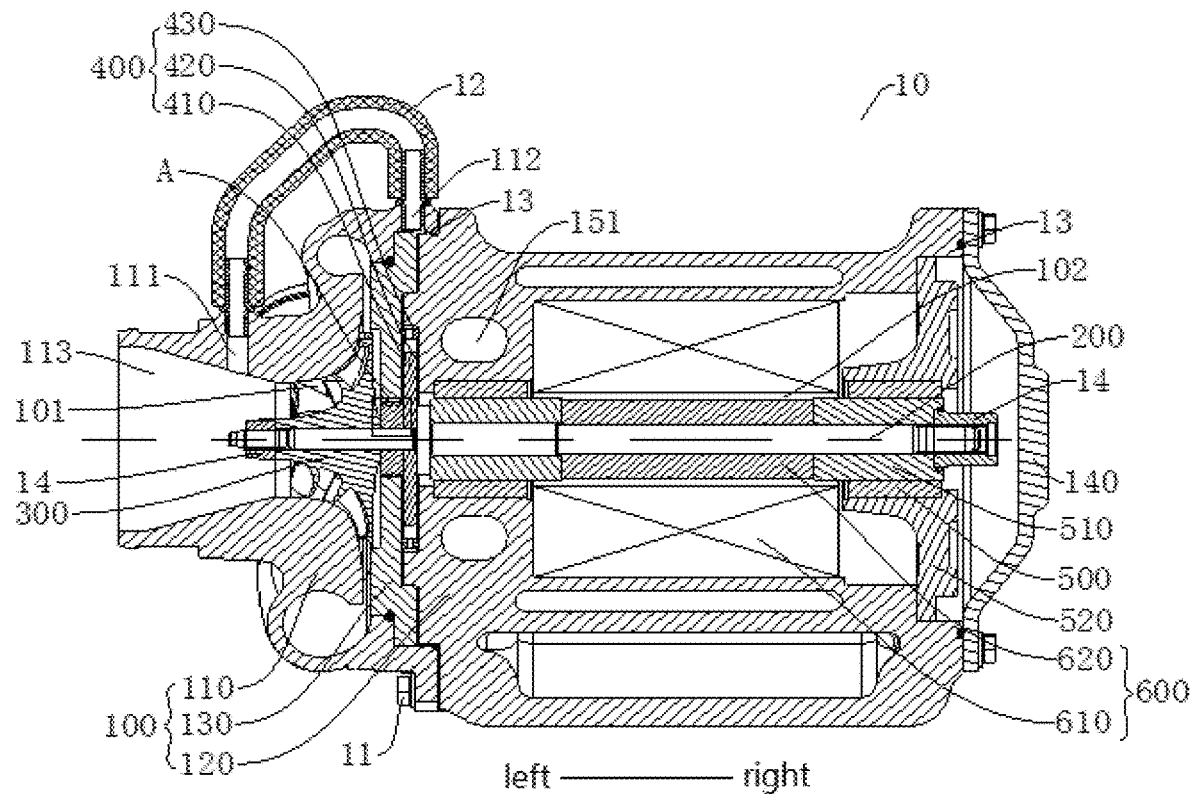
FIG. 3 is a schematic structural diagram of the air compressor according to an embodiment of the present disclosure.

According to some embodiments of the present disclosure, as shown in FIG. 3, the air compressor includes: a housing assembly 100, a rotor shaft 200 and a driving assembly 600. The housing assembly 100 has the compressing cavity 101, an installation cavity 102 and a rotation-shaft cooperating cavity, and the rotation-shaft cooperating cavity is disposed between the compressing cavity 101 and the installation cavity 102. The rotor shaft 200 is rotatably fitted inside the rotation-shaft cooperating cavity, and the rotor shaft 200 extends into the compressing cavity 101 and the installation cavity 102; in other words, the rotation-shaft cooperating cavity is in communication with the compressing cavity 101 and the installation cavity 102. The pressure wheel 300 is nested to the rotor shaft 200.

A first end of the control flow channel is in communication with the gas-intake side of the pressure wheel 300, and a second end of the control flow channel is in communication with the wheel-back side of the pressure wheel 300. The driving assembly 600 is nested to the rotor shaft 200, and the driving assembly 600 is located inside the installation cavity 102, to provide the power. For example, the driving assembly 600 may include an electric-motor stator 610 and an electric-motor rotor 620, and the electric-motor rotor 620 is rotatably disposed inside the electric-motor stator 610.

The control flow channel may be disposed outside the housing assembly 100. Alternatively, the control flow channel may also be disposed inside the housing assembly 100. Certainly, the control flow channel may also be configured so that part of it is disposed outside the housing assembly 100, and the other part is disposed inside the housing assembly 100. It is merely required that the control flow channel can be in communication with the gas-intake side and the wheel-back side of the pressure wheel 300, and the present disclosure does not particularly limit herein. Accordingly, the control flow channel can guide the gas on the wheel-back side of the pressure wheel 300 to flow, thereby reducing the pressure on the wheel-back side of the pressure wheel 300, and reducing the axial force.

According to some embodiments of the present disclosure, as shown in FIG. 3, the compressing cavity 101 has an extending-throughout returning opening 111, and the control flow channel includes an internal flow channel and an external flow channel 12. The internal flow channel is located inside the housing assembly 100, and is defined by the housing assembly 100. The internal flow channel is located on the wheel-back side of the pressure wheel 300. The external flow channel 12 is located outside the housing assembly 100, and the external flow channel 12 is in communication with the internal flow channel and the gas-intake side of the pressure wheel 300. The external flow channel 12 may be an externally connected communicating pipe, and may also be a flowing-back device that is integrated outside the housing assembly 100. The return valve 15 is disposed on the external flow channel 12.

Particularly, the returning opening 111 is located on the gas-intake side of the pressure wheel 300, and the wheel-back side of the pressure wheel 300 is in communication with the returning opening 111 via the internal flow channel and the external flow channel 12, thereby realizing the communication with the gas-intake side of the pressure wheel 300. In other words, the gas on the wheel-back side of the pressure wheel 300 may sequentially pass through the internal flow channel, the external flow channel 12 and the returning opening 111 and then flow back to the gas-intake side of the pressure wheel 300.

The gas on the wheel-back side of the pressure wheel 300, when flowing to the external flow channel 12, still has a certain positive pressure, and the returning opening 111 is located behind the operation of the air filter and in front of the pressure wheel 300, by the effects of the pressure drop of the air filter and the suction of the pressure wheel 300, the pressure of the gas at the returning opening 111 is slightly less than the atmospheric pressure. Accordingly, the gas inside the air compressor 10 can form an automatic and smooth circulation among the gas-intake side of the pressure wheel 300, the wheel-back side of the pressure wheel 300, the internal flow channel and the external flow channel 12, thereby reducing the pressure on the wheel-back side of the pressure wheel 300, and reducing the axial force.

In some embodiments of the present disclosure, as shown in FIG. 3, the internal flow channel is in the axial direction of the rotor shaft 200, and is located between the compressing cavity 101 and the installation cavity 102. For example, the internal flow channel is located at the rear of the compressing cavity 101 and located in front of the installation cavity 102. Accordingly, the flowing gas can take away the heat generated by the component parts at the corresponding position.

Figure 2:
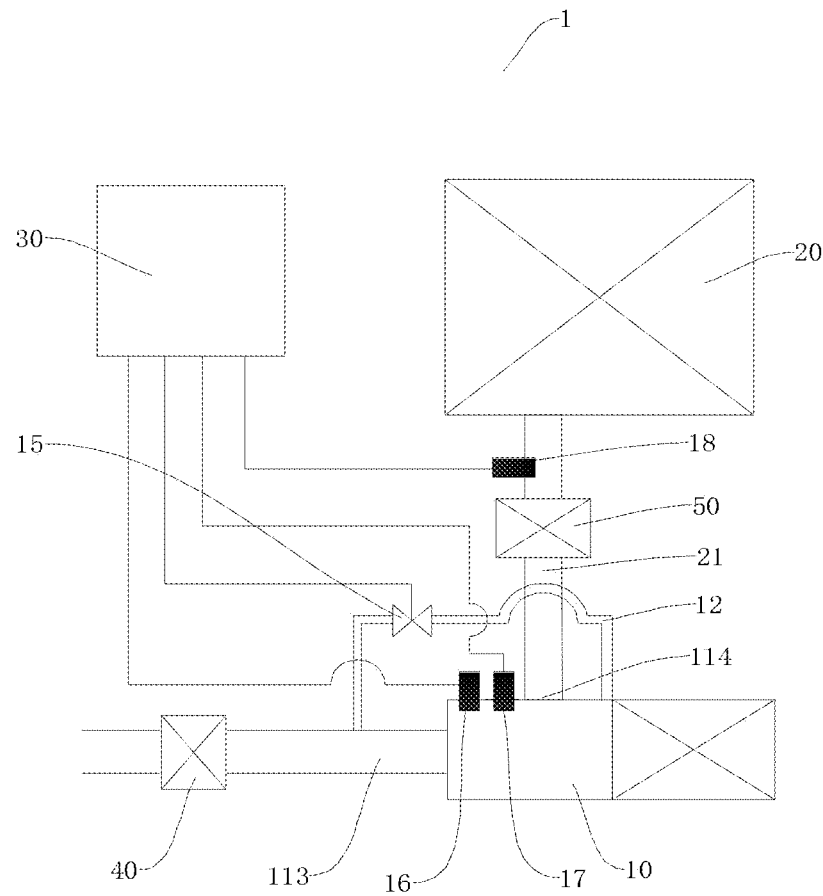
FIG. 2 is a schematic structural diagram of the fuel cell control system according to an embodiment of the present disclosure.

According to some embodiments of the present disclosure, as shown in FIG. 2, the housing assembly 100 includes: a pressing housing 110, a driving housing 120 and a back plate 130. The pressing housing 110 defines the compressing cavity 101, and the driving housing 120 defines the installation cavity 102. The back plate 130 is disposed between the pressing housing 110 and the driving housing 120, the back plate 130 is located on the wheel-back side of the pressure wheel 300, and a back-pressure gap 105 is formed between the back plate 130 and the pressure wheel 300. That can prevent collision and friction of the pressure wheel 300 in operation, and allows the flowing of the high-pressure gas after the boosting at the same time. The driving housing 120 is disposed on the side of the back plate 130 that is opposite to the pressure wheel 300, and the back plate 130 and the driving housing 120 enclose to form a thrust cavity 104. The back plate 130 is provided with a first rotation-shaft hole 131, a second rotation-shaft hole 121 is disposed inside the driving housing 120, a thrust bearing 400 is disposed inside the thrust cavity 104, and the first rotation-shaft hole 131, the second rotation-shaft hole 121 and the thrust cavity 104 jointly define the rotation-shaft cooperating cavity.

Particularly, the pressing housing 110 and the driving housing 120 may be mounted and fixed by using a bolt 11, and the back plate 130 is clamped between the pressing housing 110 and the driving housing 120; in other words, the back plate 130 is located at the rear of the pressing housing 110 and located in front of the driving housing 120. The pressing housing 110 presses the back plate 130 and the thrust bearing 400 onto the driving housing 120 in the front-rear direction. Accordingly, the structure is simple and reliable. The thrust cavity 104 is defined by the rear surface of the back plate 130 and the front end face of the driving housing 120, the first rotation-shaft hole 131 is in communication with the compressing cavity 101, the second rotation-shaft hole 121 is in communication with the installation cavity 102, and the thrust cavity 104 is in communication with the first rotation-shaft hole 131 and the second rotation-shaft hole 121. Accordingly, the gas can flow through the thrust cavity 104 and cool the thrust bearing 400, and can cool the component parts inside the installation cavity 102.

Optionally, as shown in FIG. 2, a rubber sealing ring 13 is disposed at the connection between the pressing housing 110 and the driving housing 120, and a rubber sealing ring 13 is disposed at the connection between the pressing housing 110 and the back plate 130. That can prevent gas leakage, thereby ensuring that the gas smoothly flows inside the internal flow channel.

In some embodiments of the present disclosure, as shown in FIG. 2, the thrust bearing 400 may include: a thrust rotor 410, a bearing foil 420 and a holding ring 430. The thrust rotor 410 is nested to the rotor shaft 200, the bearing foil 420 is disposed on the side wall of the thrust cavity 104, and the bearing foil 420 and the thrust rotor 410 are spaced to form a thrust gap that is in communication with the first rotation-shaft hole 131. The holding ring 430 is disposed inside the thrust cavity 104, the holding ring 430 surrounds the thrust rotor 410, and the holding ring 430 is sandwiched between the driving housing 120 and the back plate 130. For example, the bearing foil 420 is two bearing foils 420, the thrust rotor 410 is located between the two bearing foils 420 in the front-rear direction, and the front end face and the rear end face of the thrust rotor 410 form thrust gaps individually with the two bearing foils 420, to allow gas flowing. Furthermore, the thrust rotor 410 and the bearing foil 420, in the relative movement, because of the particularly designed structure, generate a dynamic pressure, to balance the axial force acting on the pressure wheel 300.

In some embodiments of the present disclosure, a gas guiding channel is disposed at the back plate 130, and the gas guiding channel is in communication with the back-pressure gap 105 to form a part of the internal flow channel. For example, one end of the gas guiding channel is in communication with the back-pressure gap 105, and the other end is in communication with the external flow channel 12. In this case, the gas guiding channel is in direct communication with the back-pressure gap 105. As another example, the first rotation-shaft hole 131 is in communication with the back-pressure gap 105, one end of the gas guiding channel is in communication with the first rotation-shaft hole 131, and the other end is in communication with the external flow channel 12. In this case, the back-pressure gap 105 is in indirect communication with the gas guiding channel via the rotation-shaft cooperating cavity.

In some other embodiments of the present disclosure, a gas guiding channel is disposed at the driving housing 120, and the gas guiding channel is in communication with the back-pressure gap 105 to form a part of the internal flow channel. For example, the first rotation-shaft hole 131 is in communication with the back-pressure gap 105, the thrust cavity 104 is in communication with the first rotation-shaft hole 131, one end of the gas guiding channel is in communication with the thrust cavity 104, and the other end is in communication with the external flow channel 12. In this case, the back-pressure gap 105 is in indirect communication with the gas guiding channel via the rotation-shaft cooperating cavity. Certainly, the one end of the gas guiding channel in the driving housing 120 may also be in communication with the second rotation-shaft hole 121.

In some other embodiments of the present disclosure, a gas guiding channel is formed between the back plate 130 and the driving housing 120, a gas guiding hole 132 is disposed at one of the back plate 130 and the driving housing, and the back-pressure gap 105, the gas guiding channel and the gas guiding hole 132 are communicated to form part of the internal flow channel.

For example, a gas guiding channel is formed between the back plate 130 and the driving housing 120, a gas guiding hole 132 is disposed at the back plate 130, one end of the gas guiding hole 132 is in communication with the back-pressure gap 105, and the other end is in communication with one end of the gas guiding channel, and the other end of the gas guiding channel is in communication with the external flow channel 12. Although not shown in the drawings, the configuration of the gas guiding hole 132 according to the present embodiment may refer to the structure shown in the drawings of the present disclosure, as long as it can realize the communication between the gas guiding channel and the back-pressure gap 105.

As another example, a gas guiding channel is formed between the back plate 130 and the driving housing 120, a gas guiding hole 132 is disposed at the driving housing 120, one end of the gas guiding hole 132 is in communication with the thrust cavity 104 or the second rotation-shaft hole 121, the other end of the gas guiding hole 132 is in communication with one end of the gas guiding channel, and the other end of the gas guiding channel is in communication with the external flow channel 12. In other words, the back-pressure gap 105 is in communication with the gas guiding hole 132 via the rotation-shaft cooperating cavity. It can also be understood that, although not shown in the drawings, the configuration of the gas guiding hole 132 according to the present embodiment may refer to the structure shown in the drawings of the present disclosure, as long as it can realize the communication between the gas guiding channel and the back-pressure gap 105.

Figure 4:
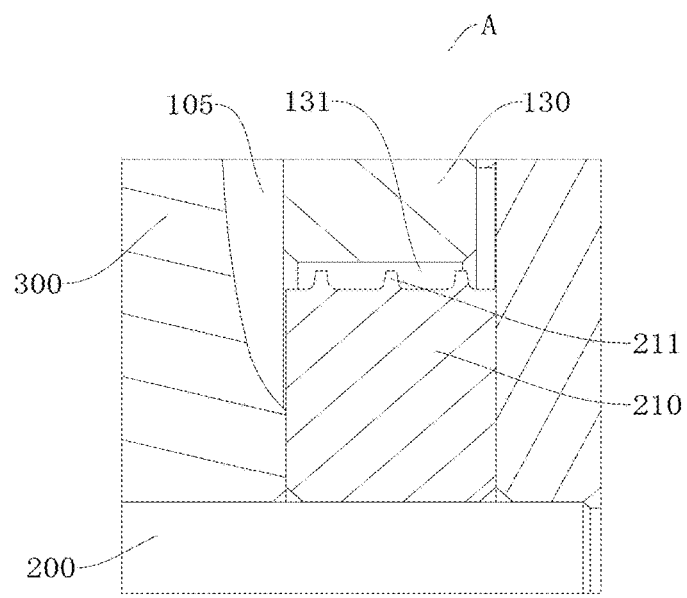
FIG. 4 is an enlarged schematic diagram of the part A circled in FIG. 3.
Figure 5:
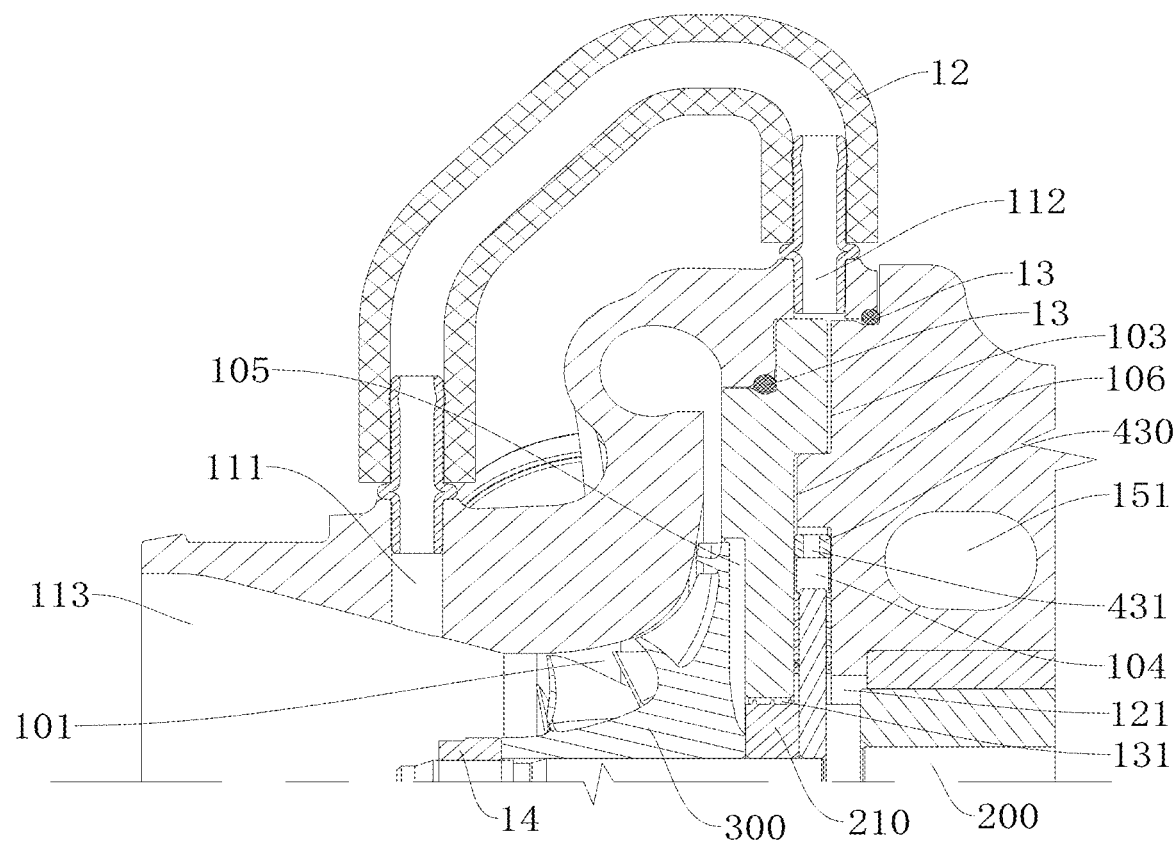
FIG. 5 is a locally schematic structural diagram of the air compressor according to an embodiment of the present disclosure.
Figure 6:
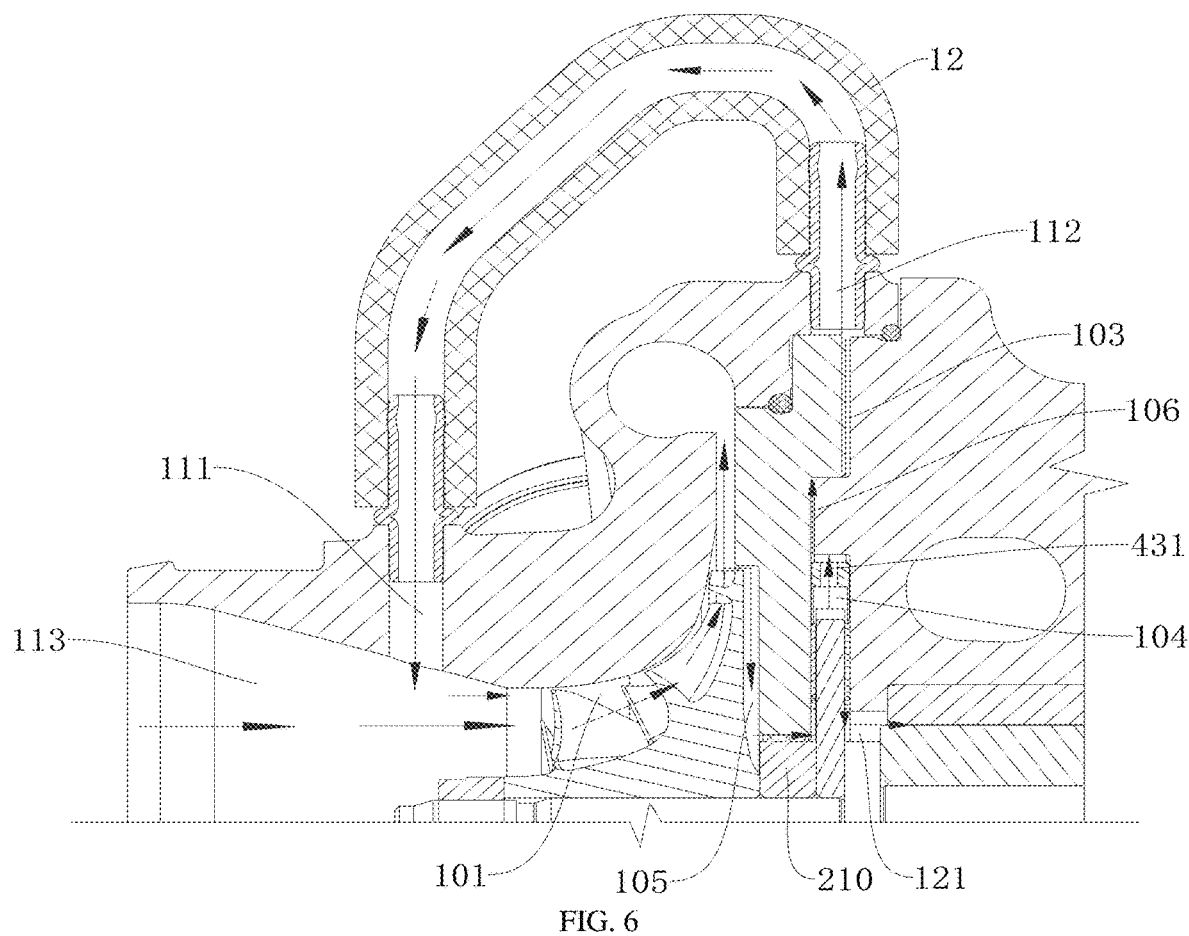
FIG. 6 is a schematic diagram of the gas flowing path inside the air compressor according to an embodiment of the present disclosure.

As another example, as shown in FIG. 4, a gas guiding channel is formed between the back plate 130 and the driving housing 120, the gas guiding channel includes a flow guiding gap 103 and a ventilating gap 106, a gas guiding hole 132 is disposed at the back plate 130, the two ends of the ventilating gap 106 are individually in communication with one side of the thrust cavity 104 and the gas guiding hole 132, and the other side of the gas guiding hole 132 is in communication with one end of the flow guiding gap 103, or, in other words, the flow guiding gap 103 and the ventilating gap 106 are spaced, and the other end of the flow guiding gap 103 is in communication with the external flow channel 12. In this case, the back-pressure gap 105 is in communication with the gas guiding channel via the rotation-shaft cooperating cavity. The internal flow channel includes the thrust cavity 104, the ventilating gap 106, the gas guiding hole 132 and the flow guiding gap 103. The gas guiding hole 132 may be a semicircular counterbore, a circular counterbore or a hole or slot of another shape, and the gas guiding hole 132 may be a plurality of gas guiding holes 132 that are arranged separately in the circumferential direction of the back plate 130.

Figure 7:
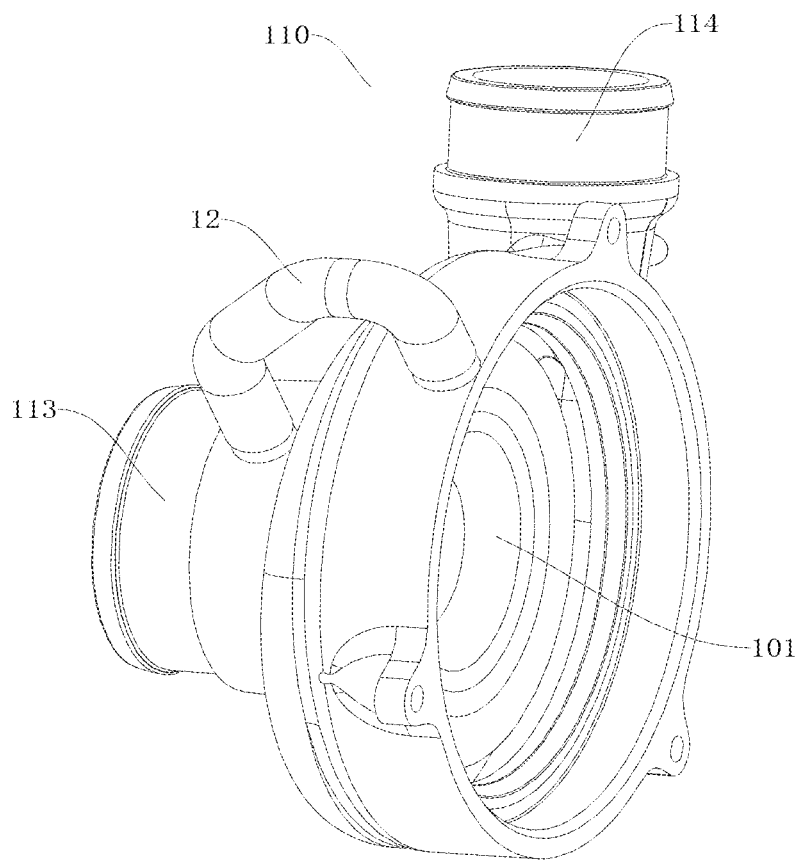
FIG. 7 is a perspective view of the pressing housing according to an embodiment of the present disclosure.

Optionally, the gas guiding channel includes a flow guiding gap 103 and a ventilating gap 106, and the flow guiding gap 103 and the ventilating gap 106 are spaced. As shown in FIG. 7, gas guiding holes 132 are disposed at a position of the back plate 130 that is adjacent to the middle part and at the edge of the back plate 130, the gas guiding hole 132 adjacent to the middle part is in communication with the back-pressure gap 105 and the ventilating gap 106, and the gas guiding hole 132 adjacent to the edge is in communication with the ventilating gap 106 and the flow guiding gap 103.

Figure 8:
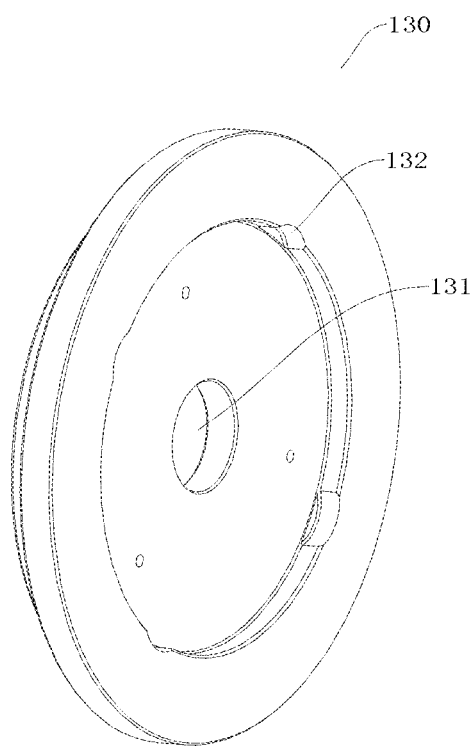
FIG. 8 is a perspective view of the back plate according to an embodiment of the present disclosure.
Figure 9:
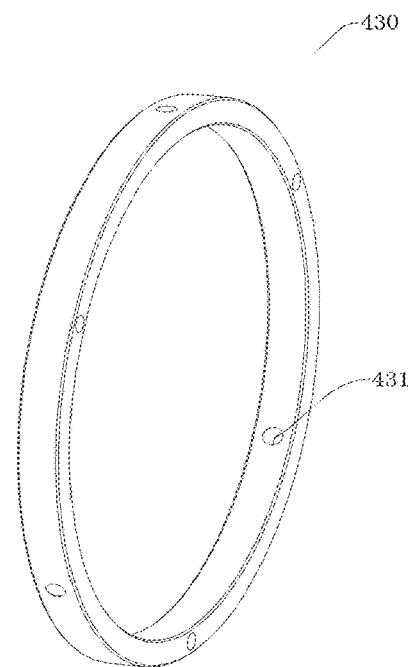
FIG. 9 is a perspective view of the holding ring according to an embodiment of the present disclosure.

In some particular embodiments of the present disclosure, a gas guiding channel is formed between the back plate 130 and the driving housing 120, and as shown in FIGS. 4 and 8, the holding ring 430 is provided with a ventilating hole 431 that communicates the thrust cavity 104 and the gas guiding channel (for example, the ventilating gap 106). For example, the holding ring 430 is a round ring, the holding ring 430 is provided with the ventilating hole 431 that extends throughout it radially, the ventilating hole 431 includes but is not limited to a round hole, a rectangular slot and a semicircular slot, and the ventilating hole 431 may be one or more ventilating holes 431.

Accordingly, the gas can enter the thrust cavity 104 via the first rotation-shaft hole 131, and subsequently flows into the gas guiding channel via the ventilating hole 431. In other words, the back-pressure gap 105 is in communication with the gas guiding channel via the rotation-shaft cooperating cavity. In the present embodiment, the communication with the external flow channel 12 may be realized by providing the flow guiding gap 103, the ventilating gap 106 and the gas guiding hole 132 shown in the figures, and the gas guiding channel and the external flow channel 12 may also be communicated by providing the gas guiding hole 132 at the back plate 130 or the driving housing 120. Because the thrust bearing 400 is required to bear a large axial force, the thrust rotor 410 and the bearing foil 420 generate a large amount of heat in starting-up and high-speed operation, and the flowing gas can cool the thrust bearing 400 to a certain extent, thereby cooling the thrust bearing 400, to improve the reliability of the thrust bearing 400.

It can be understood that the present disclosure merely illustratively describes the configuration of the gas guiding channel and the gas guiding hole, and does not limit the gas guiding channel and the gas guiding hole, and they may be adjusted according to the particular structures of the back plate 130 and the driving housing 120, as long as the gas flowing is ensured.

Optionally, as shown in FIG. 3, a shaft seal 210 is nested to the rotor shaft 200, the rotor shaft 200 is mounted inside the first rotation-shaft hole 131 by using the shaft seal 210, and a flowing gap is formed between the shaft seal 210 and the inner wall of the first rotation-shaft hole 131. Accordingly, the back-pressure gap 105 may be in communication with one of the gas guiding channel and the gas guiding hole 132 via the flowing gap. Here, whether the back-pressure gap 105, via the flowing gap, is in communication with the gas guiding channel or in communication with the gas guiding hole 132 is decided according to the particular situation. For example, in the above embodiments, when the gas guiding channel is closer to the back-pressure gap 105 in the gas-flow direction, the back-pressure gap 105 is in communication with the gas guiding channel via the flowing gap.

As shown in FIG. 4, the shaft seal 210 and the first rotation-shaft hole 131 may form a maze sealing member 211 therebetween. For example, the front end of the shaft seal 210 abuts the wheel back of the pressure wheel 300, the rear end of the shaft seal 210 abuts the thrust rotor 410, and a plurality of convex ribs are distributed separately along the axial direction of the shaft seal 210, whereby a deviously extending gap is formed inside the first rotation-shaft hole 210. That can prevent leakage of excessive gas to the thrust bearing 400.

In some particular embodiments of the present disclosure, as shown in FIG. 4, the first rotation-shaft hole 131 is in communication with the external flow channel 12 via the thrust cavity 104. In other words, after passing through the first rotation-shaft hole 131, the gas on the wheel-back side of the pressure wheel 300 flows to the external flow channel 12 via the thrust cavity 104. Accordingly, the flowing gas can take away the heat generated by the high-speed relative rotation between the rotor shaft 200 and the thrust bearing 400.

In some embodiments of the present disclosure, as shown in FIG. 2, the housing assembly 100 is provided with a cooling flow channel 151 adjacent to the thrust bearing 400 and the internal flow channel. Accordingly, the gas inside the thrust bearing 400 and the internal flow channel can be cooled.

The fuel cell control system 1 according to a particular embodiment of the present disclosure will be described below with reference to the drawings.

As shown in FIGS. 2-13, the return valve 15 is disposed inside the external flow channel 12 to regulate the flow rate of the external flow channel 12, the first sensor 16 is disposed between the gas inlet 113 and the pressure wheel 300 to detect the state of the gas intake of the air compressor 10, the second sensor 17 is disposed at the pressing housing 110 to detect the rotational speed of the pressure wheel 300, and the third sensor 18 is disposed between the intercooler 50 and the reactor 20 to monitor the state of the gas actually entering the reactor 20. The signals detected by the first sensor 16, the second sensor 17 and the third sensor 18 are transmitted to the central control unit 30 via harnesses. The central control unit 30, by analyzing the signals, determines the operating states of the reactor 20 and the air compressor 10, thereby regulating and controlling the return valve 15.

As shown in FIGS. 3-9, a cover plate 140 is mounted to the rear end of the driving housing 120 by a bolt 11, and a rubber sealing ring 13 is disposed at the connection between the cover plate 140 and the driving housing 120. The pressure wheel 300, the shaft seal 210 and the thrust rotor 410 are mounted on the rotor shaft 200 sequentially from front to rear, are pressed onto the shaft shoulder of the rotor shaft 200 by nuts 14, and are rotated together with the rotor shaft 200 at a high speed. A radial air bearing 500 is disposed inside the second rotation-shaft hole 121, a sleeve 510 is disposed on the inner side of the radial air bearing 500, and the sleeve 510 is nested to the rotor shaft 200. The radial air bearing 500 serves to support the rotor shaft 200, and the radial air bearing 500 is fixed by using a bearing seat 520.

The pressing housing 110 is provided with a gas releasing hole 112 and a returning opening 111, and the gas releasing hole 112 and the returning opening 111 are connected by the external flow channel 12. The wheel back of the pressure wheel 300 and the front surface of the back plate 130 define the back-pressure gap 105 therebetween, the back plate 130 is provided with the first rotation-shaft hole 131, and the front end face and the rear end face of the thrust rotor 410 form thrust gaps individually with the two bearing foils 420. The rear surface of the back plate 130 and the front end face of the driving housing 120 define the ventilating gap 106 and the flow guiding gap 103, the flow guiding gap 103 is located outside the ventilating gap 106, the holding ring 430 is provided with the ventilating hole 431 communicating the thrust gap and the ventilating gap 106, and the gas guiding hole 132 communicates the flow guiding gap 103 and the ventilating gap 106. The internal flow channel includes the back-pressure gap 105, the gap between the maze sealing member 211 and the first rotation-shaft hole 131, the thrust gap, the ventilating hole 431, the ventilating gap 106, the gas guiding hole 132 and the flow guiding gap 103.

When the central control unit 30 controls the return valve 15 to close, the flow rate of the gas flowing through the control flow channel is zero, and the gas flowing out of the pressure wheel 300 flows to the reactor 20 via the gas outlet 114. When the central control unit 30 controls the return valve 15 to open, the gas flowing out of the pressure wheel 300 is split into two parts, wherein one part of the gas flows to the reactor 20 via the gas outlet 114, and the other part of the gas flows into the control flow channel.

The flowing path of the gas inside the control flow channel is as follows. The high-pressure gas entering the back-pressure gap 105, via the gap between the maze sealing member 211 and the first rotation-shaft hole 131, enters the thrust gap. The flowing gas, after passing through the thrust gap, flows out of the ventilating hole 431 in the holding ring 430. The gas, after flowing out of the holding ring 430, passes through the ventilating gap 106, and subsequently enters the flow guiding gap 103 via the gas guiding hole 132. The gas inside the flow guiding gap 103 enters the external flow channel 12 via the gas releasing hole 112, subsequently flows to the returning opening 111 via the external flow channel 12, and enters the front side of the pressure wheel 300 again. The magnitude of the flow rate of the gas entering the external flow channel 12 is decided by the opening degree of the return valve 15. (Part of the gas passes through the second rotation-shaft hole 121, and flows between the radial air bearing 500 and the sleeve 510 to cool them)

When flowing to the external flow channel 12, the gas on the wheel-back side of the pressure wheel 300 still has a certain positive pressure, and the returning opening 111 is located behind the operation of the air filter 40 and in front of the pressure wheel 300, by the effects of the pressure drop of the air filter 40 and the suction of the pressure wheel 300, the pressure of the gas at the returning opening 111 is slightly less than the atmospheric pressure. Therefore, the gas may start from the back-pressure gap 105, pass through the shaft seal 210, the thrust bearing 400, the holding ring 430, the ventilating gap 106, the gas guiding hole 132 and the flow guiding gap 103, and flow to the gas releasing hole 112, and then flow via the external flow channel 12 to the returning opening 111.

Accordingly, the gas flowing through the control flow channel can form an automatic and smooth circulation, thereby reducing the pressure on the wheel-back side of the pressure wheel 300, and in turn reducing the axial force acting on the wheel back of the pressure wheel 300. Furthermore, because the thrust bearing 400 is required to bear a large axial force, the thrust rotor 410 and the bearing foil 420 generate a large amount of heat in starting-up and high-speed operation, and the flowing gas can cool the thrust bearing 400 to a certain extent. The gas taking away the heat is cooled by the cooling flow channel 151, and subsequently flows back to the gas inlet 113, which can effectively improve the field surging characteristic of the air compressor 10, so as to improve the performance of the air compressor 10.

The operation processes in different working conditions of the fuel cell control system 1 according to the embodiments of the present disclosure will be described below with reference to the drawings.

Figure 11:
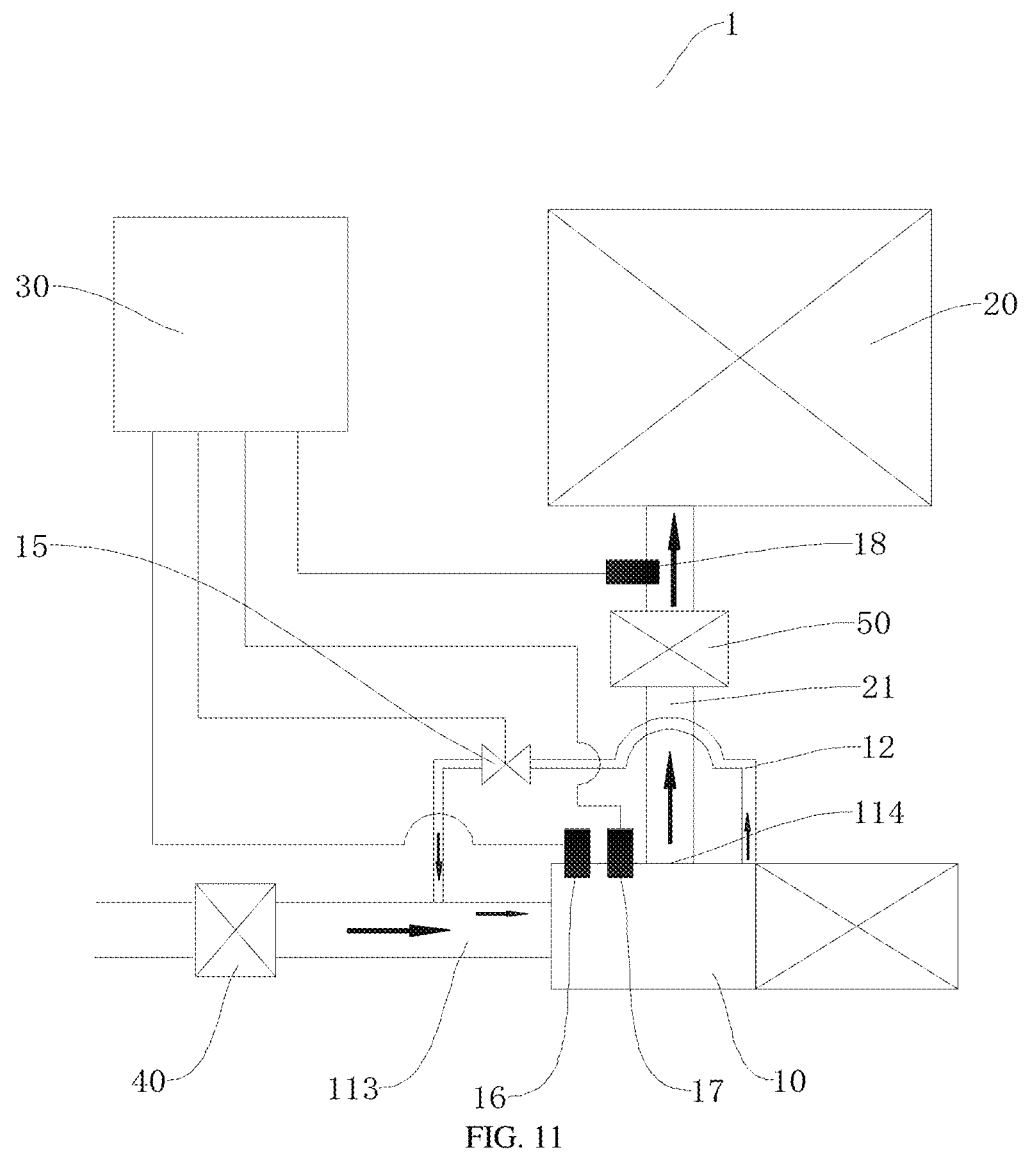
FIG. 11 is a schematic structural diagram of the fuel cell control system according to an embodiment of the present disclosure.

As shown in FIG. 11, the fuel cell control system 1 is electrified, the air compressor 10 starts up, the rotor system has a low rotational speed, the boost pressure has not been completely established, and the pressure on the wheel-back side of the pressure wheel 300 is small. In other words, the axial force is small, and a large scale of the flowing of the gas is not required to reduce the axial force. At the same time, because the thrust bearing 400 has a certain load to the rotor system, and the dynamic-pressure gas film has not been generated, the thrust rotor 410 and the bearing foil 420 are in a state of contact friction, thereby generating certain heat. At this point, the second sensor 17 detects that the rotational speed of the rotor system (i.e., the rotational speed of the pressure wheel 300) is low, the central control unit 30 controls the return valve 15 to open by a low amplitude, whereby a small amount of the gas circularly flows along the control flow channel to cool the thrust bearing 400. Furthermore, that can prevent a large scale of flowing-back of the gas, ensure the flow rate of the gas flowing into the reactor 20, and ensure the performance and the responsivity of the system.

Figure 12:
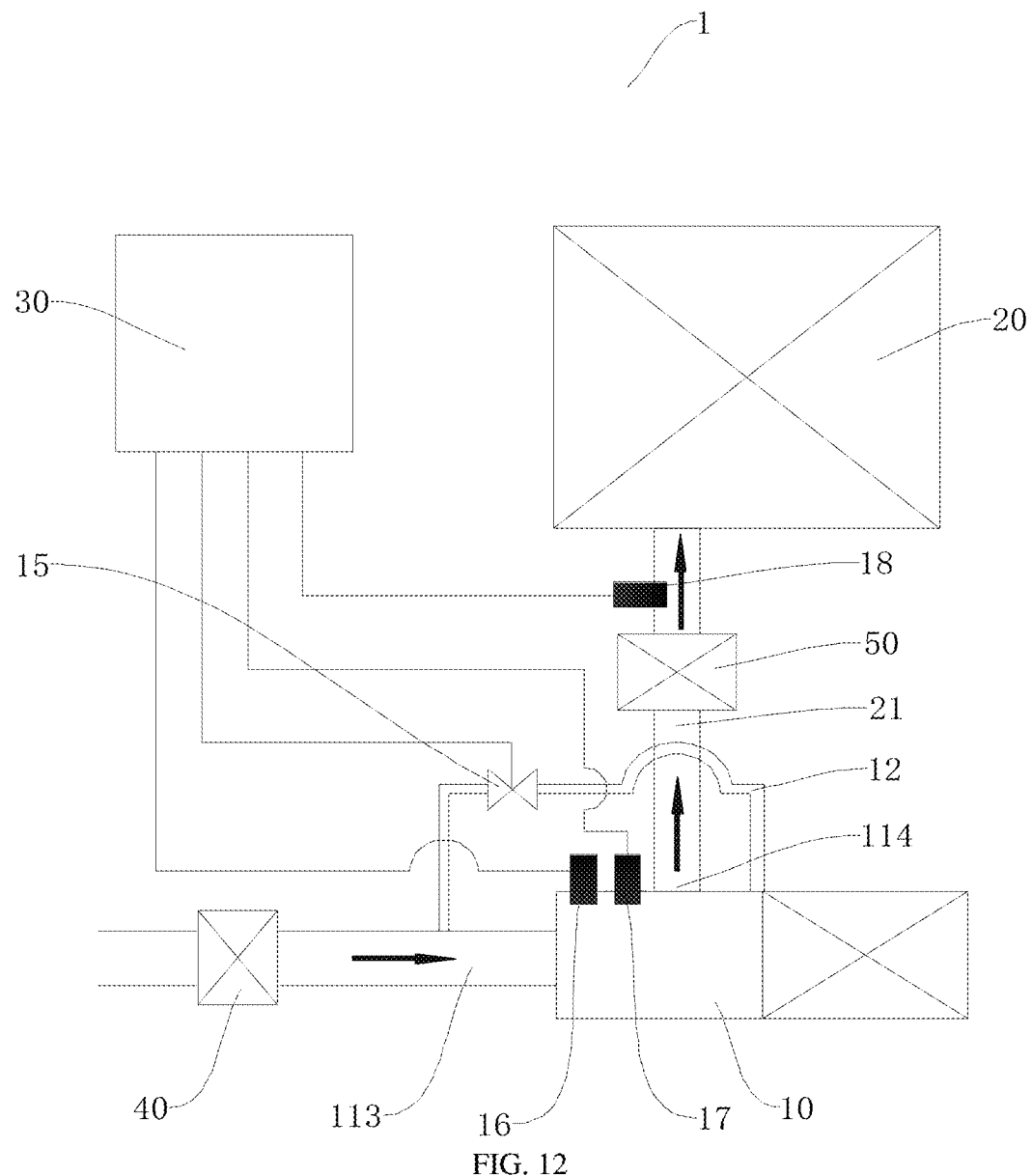
FIG. 12 is a schematic structural diagram of the fuel cell control system according to an embodiment of the present disclosure.

As shown in FIG. 12, the rotor system of the fuel cell control system 1 has a low rotational speed and a low load. When the rotational speed of the rotor system has reached a certain numerical value, a dynamic-pressure gas film is generated between the thrust rotor 410 and the bearing foil 420, and the rotor shaft and the thrust bearing 400, and the thrust rotor 410 and the bearing foil 420, do not contact any longer, whereby the generated heat is reduced. At this point, the thrust bearing 400 can be cooled by the cooling flow channel 151, and it is not required to cool the thrust bearing 400 by using the gas circularly flowing along the control flow channel. At the same time, the second sensor 17 detects the rotational speed of the rotor system (i.e., the rotational speed of the pressure wheel 300), the central control unit 30 receives the signal transmitted by the second sensor 17, the central control unit 30 controls the return valve 15 to close, and the gas that has been boosted by the air compressor 10 enters the reactor 20 via the after-pressure pipeline to perform the chemical reaction. Accordingly, the flow rate of the gas flowing into the reactor 20 is high, which can improve the performance and the responsivity of the system.

Figure 13:
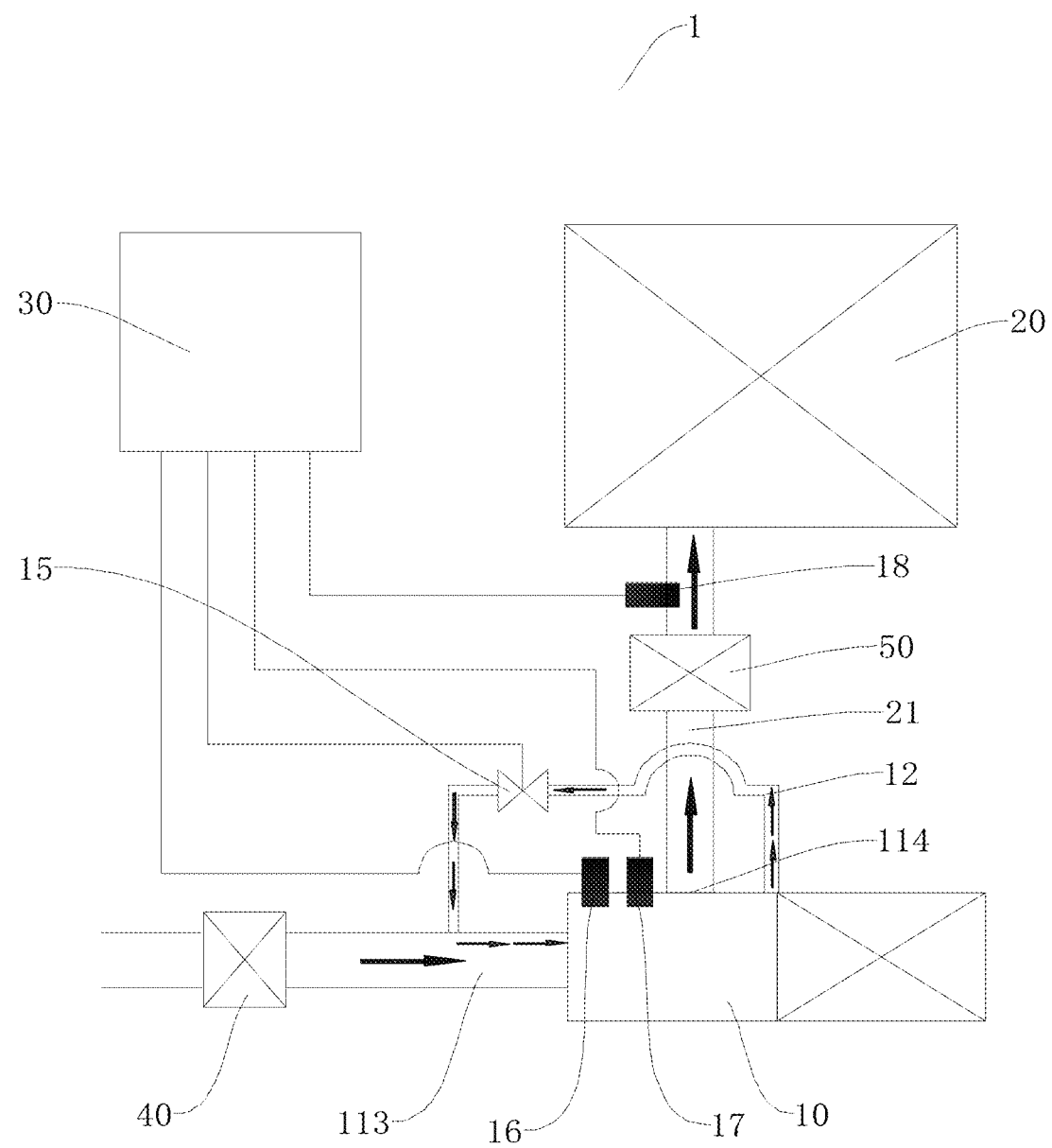
FIG. 13 is a schematic structural diagram of the fuel cell control system according to an embodiment of the present disclosure.

As shown in FIG. 13, in this case, the rotor system of the fuel cell control system 1 has a high rotational speed. The pressure on the wheel-back side of the pressure wheel 300 is large; in other words, the axial force is large, and the thrust bearing 400 generates a large amount of heat. The second sensor 17 detects that the rotational speed of the rotor system (i.e., the rotational speed of the pressure wheel 300) is high, the third sensor 18 has detected that the pressure of the gas flowing into the reactor 20 reaches a preset value, the central control unit 30 receives the signals transmitted by the second sensor 17 and the third sensor 18, and the central control unit 30 controls the return valve 15 to open by a high amplitude. The gas that has been boosted by the air compressor 10 is split into two parts, one part of the gas enters the reactor 20 via the after-pressure pipeline to perform the chemical reaction, and the other part of the gas flows back to the gas inlet 113 via the control flow channel. That can increase the efficiency of the flowing-back of the gas, and effectively reduce the pressure on the wheel-back side of the pressure wheel 300. Furthermore, the gas flowing through the control flow channel has a higher flow rate and a higher flow speed, so as to take away more heat, to result in a better effect of the cooling.

In conclusion, the fuel cell control system 1 according to the embodiments of the present disclosure can reduce the axial force, ensure the gas flow rate flowing into the reactor 20, cool the thrust bearing 400 and the radial air bearing 500 and improve the field surging characteristic of the air compressor 10, thereby taking into consideration the functional demands such as the controlling on the axial force of the rotor system of the air compressor, the demand of the fuel cell reactor, the cooling of the air bearing and the improvement of the field surging characteristic of the air compressor, and can be adapted for different usage environments, to provide precise closed-loop control on the entire air-backflow system.

A fuel cell control method according to the embodiments in the second aspect of the present disclosure, the fuel cell control method is for the fuel cell control system 1 according to the embodiments in the first aspect of the present disclosure, and the method includes:

electrifying to start up the air compressor 10; and
according to the rotational speed of the air compressor 10 and the pressure of the gas entering the reactor 20, controlling the opening amplitude of the return valve 15.

The fuel cell control method according to the embodiments of the present disclosure can reduce the axial force, thereby prolonging the service life of the air compressor 10, and improving the efficiency of the system. Furthermore, according to the rotational speed of the air compressor 10 and the pressure of the gas entering the reactor 20, the opening degree of the return valve 15 is controlled, to control the flow rate of the gas flowing through the control flow channel, which can realize precise controlling to the system, satisfy the operation demands of the air compressor 10 in different working conditions, and optimize the work performance of the air compressor 10 in special working conditions. In addition, the gas flowing back to the gas inlet 113 re-enters the pressure wheel 300 to be compressed, which can effectively improve the field surging characteristic of the air compressor 10, and improve the performance of the air compressor 10.

According to some embodiments of the present disclosure, as shown in FIG. 11, when the rotational speed of the air compressor 10 is less than a first rotational speed, at this point, the rotational speed of the rotor system is low, and the boost pressure has not been completely established, the return valve 15 is controlled to open by a first amplitude.

As shown in FIG. 12, when the rotational speed of the air compressor 10 is greater than or equal to the first rotational speed and less than a second rotational speed, at this point, the rotor system has a low rotational speed and a low load, the opening amplitude of the return valve 15 is controlled to be zero; in other words, the return valve 15 is controlled to close.

As shown in FIG. 13, when the rotational speed of the air compressor 10 is greater than or equal to the second rotational speed and the pressure of the gas entering the reactor 20 reaches a preset value, at this point, the rotor system has a high rotational speed, the return valve 15 is controlled to open by a second amplitude, wherein the second amplitude is greater than the first amplitude.

Accordingly, the fuel cell control method according to the embodiments of the present disclosure takes into consideration the functional demands such as the controlling on the axial force of the rotor system of the air compressor, the demand of the fuel cell reactor, the cooling of the air bearing and the improvement of the field surging characteristic of the air compressor, and can be adapted for different usage environments, to provide precise closed-loop control on the entire air-backflow system.

A person skilled in the art should understand that some or all of the functions of some or all of the components of the computing and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or disposed on a carrier signal, or disposed in any other forms.

Figure 14:
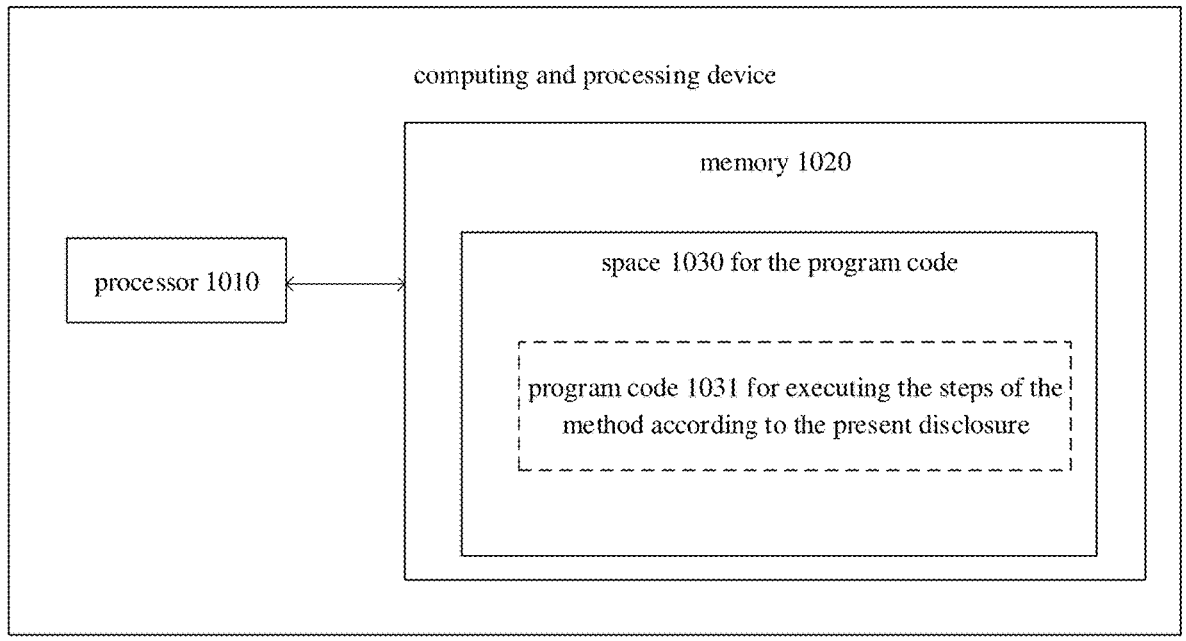
FIG. 14 schematically shows a block diagram of a computing and processing device for executing the method according to the present disclosure.
Figure 15:
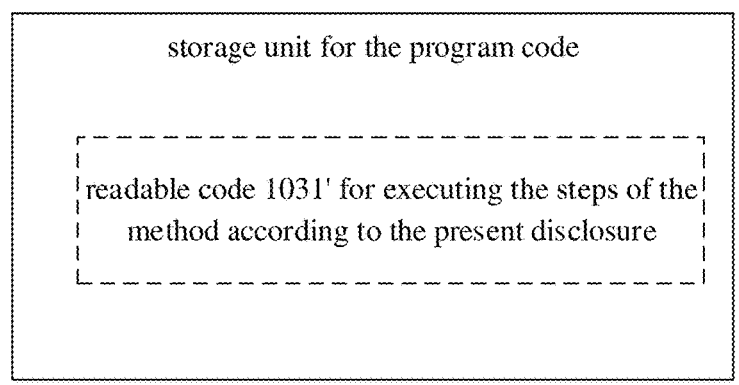
FIG. 15 schematically shows a storage unit for maintaining or carrying a program code for executing the method according to the present disclosure.

For example, FIG. 14 shows a computing and processing device that can execute the method according to the present disclosure. The computing and processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 15. The storage unit may have storage segments or storage spaces with similar arrangement to the memory 1020 of the computing and processing device in FIG. 14. The program codes may, for example, be compressed in a suitable form. Generally, the storage unit contains a computer-readable code 1031', which can be read by a processor like 1010. When those codes are executed by the computing and processing device, the codes cause the computing and processing device to execute each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The invention claimed is:

1. A fuel cell control system, wherein the system comprises:
    a reactor;
    an air compressor, wherein the air compressor has a compressing cavity, the compressing cavity has a gas inlet and a gas outlet, a rotatable pressure wheel is disposed inside the compressing cavity, and the gas outlet is in communication with the reactor;
    a control flow channel, wherein a first end of the control flow channel is in communication with a gas-intake side of the pressure wheel, a second end of the control flow channel is in communication with a wheel-back side of the pressure wheel, and the control flow channel is provided with a return valve for regulating a flow rate of the control flow channel; and
    a central control unit, wherein the central control unit is communicatively connected to the return valve to control an opening degree of the return valve;
    wherein the air compressor comprises:
    a housing assembly, wherein the housing assembly has the compressing cavity, an installation cavity and a rotation-shaft cooperating cavity, and the rotation-shaft cooperating cavity is disposed between the compressing cavity and the installation cavity;
    wherein the housing assembly comprises:
    a pressing housing, wherein the pressing housing defines the compressing cavity;
    a driving housing, wherein the driving housing defines the installation cavity; and
    a back plate, wherein the back plate is disposed between the pressing housing and the driving housing, the back plate is located on the wheel-back side of the pressure wheel and forms a back-pressure gap with the pressure wheel, the driving housing is disposed on one side of the back plate that is opposite to the pressure wheel, and the back plate and the driving housing enclosure to form a thrust cavity; and
    the back plate is provided with a first rotation-shaft hole, a second rotation-shaft hole is disposed inside the driving housing, a thrust bearing is disposed inside the thrust cavity, and the first rotation-shaft hole, the second rotation-shaft hole and the thrust cavity jointly define the rotation-shaft cooperating cavity.

2. The fuel cell control system according to claim 1, wherein the system further comprises: an air filter; and
    the air filter is disposed in a gas-intake direction of the air compressor, and is located at an upstream of the gas inlet.

3. The fuel cell control system according to claim 1, wherein the system further comprises:
    a first sensor for detecting an intake pressure and/or an intake temperature of the air compressor, wherein the first sensor is adjacent to the gas inlet, and is communicatively connected to the central control unit.

4. The fuel cell control system according to claim 3, wherein the first sensor is disposed in a gas-intake direction of the air compressor, and is located at a downstream of the first end of the control flow channel.

5. The fuel cell control system according to claim 1, wherein the system further comprises:
    a second sensor for detecting a rotational speed of the pressure wheel, wherein the second sensor is adjacent to the pressure wheel, and is communicatively connected to the central control unit.

6. The fuel cell control system according to claim 1, wherein an intercooler is disposed between the gas outlet and the reactor, a third sensor for detecting an intake temperature and/or an intake pressure of the reactor is disposed between the intercooler and the reactor, and the third sensor is communicatively connected to the central control unit.

7. The fuel cell control system according to claim 1, wherein the air compressor further comprises:
    a rotor shaft, wherein the rotor shaft is rotatably fitted inside the rotation-shaft cooperating cavity, and extends into the compressing cavity and the installation cavity, and the pressure wheel is nested to the rotor shaft; and
    a driving assembly, wherein the driving assembly is nested to the rotor shaft and is located inside the installation cavity.

8. The fuel cell control system according to claim 1, wherein the control flow channel comprises an internal flow channel and an external flow channel, the internal flow channel is located inside the housing assembly, and the internal flow channel is in communication with the wheel-back side of the pressure wheel; and
    the external flow channel is located outside the housing assembly, the external flow channel is in communication with the internal flow channel and the gas-intake side of the pressure wheel, and the return valve is disposed in the external flow channel.

9. The fuel cell control system according to claim 8, wherein the compressing cavity has an extending-throughout returning opening; and
    the returning opening is located on the gas-intake side of the pressure wheel, and the wheel-back side of the pressure wheel is in communication with the returning opening via the internal flow channel and the external flow channel.

10. The fuel cell control system according to claim 8, wherein the internal flow channel is in an axial direction of the rotor shaft, and is located between the compressing cavity and the installation cavity.

11. The fuel cell control system according to claim 1, wherein a gas guiding channel is disposed at the back plate or the driving housing, and the gas guiding channel is in communication with the back-pressure gap to form a part of the control flow channel.

12. The fuel cell control system according to claim 1, wherein a gas guiding channel is formed between the back plate and the driving housing, a gas guiding hole is disposed at the back plate or the driving housing, and the back-pressure gap, the gas guiding channel and the gas guiding hole are communicated to form a part of the control flow channel.

13. The fuel cell control system according to claim 12, wherein a shaft seal is nested to the rotor shaft, the rotor shaft is mounted inside the first rotation-shaft hole by using the shaft seal, a flowing gap is formed between the shaft seal and an inner wall of the first rotation-shaft hole, and the back-pressure gap is in communication with the gas guiding channel or the gas guiding hole via the flowing gap.

14. The fuel cell control system according to claim 1, wherein the thrust bearing comprises: a thrust rotor, a bearing foil and a holding ring;
the thrust rotor is nested to the rotor shaft, the bearing foil is disposed on a side wall of the thrust cavity, and the bearing foil and the thrust rotor are spaced to form a thrust gap that is in communication with the first rotation-shaft hole; and
the holding ring is disposed inside the thrust cavity, the holding ring surrounds the thrust rotor, and the holding ring is sandwiched between the driving housing and the back plate.

15. A fuel cell control method for the fuel cell control system according to claim 1, wherein the method comprises:
by one or more processors, electrifying to start up the air compressor; and
by one or more processors, according to a rotational speed of the air compressor and a pressure of a gas entering the reactor, controlling an opening amplitude of the return valve.

16. The fuel cell control method according to claim 15, wherein the method comprises when the rotational speed of the air compressor is less than a first rotational speed, controlling the return valve to open by a first amplitude;
when the rotational speed of the air compressor is greater than or equal to the first rotational speed and less than a second rotational speed, controlling the opening amplitude of the return valve to be zero; and
when the rotational speed of the air compressor is greater than or equal to the second rotational speed and the pressure of the gas entering the reactor reaches a preset value, controlling the return valve to open by a second amplitude, wherein the second amplitude is greater than the first amplitude.

17. A computing and processing device, wherein the computing and processing device comprises:
a memory storing a computer-readable code; and
one or more processors, wherein when the computer-readable code is executed by the one or more processors, the computing and processing device executes the fuel cell control method according to claim 15.

18. A computer-readable medium, wherein the computer-readable medium stores a computer-readable code, and when the computer-readable code is executed, a fuel cell control method for the fuel cell control system according to claim 15 is performed.

19. The fuel cell control system according to claim 2, wherein the air compressor comprises:
a housing assembly, wherein the housing assembly has the compressing cavity, an installation cavity and a rotation-shaft cooperating cavity, and the rotation-shaft cooperating cavity is disposed between the compressing cavity and the installation cavity;
a rotor shaft, wherein the rotor shaft is rotatably fitted inside the rotation-shaft cooperating cavity, and extends into the compressing cavity and the installation cavity, and the pressure wheel is nested to the rotor shaft; and
a driving assembly, wherein the driving assembly is nested to the rotor shaft and is located inside the installation cavity.

\* \* \* \* \*